(12) United States Patent
Green et al.

(10) Patent No.: US 7,588,169 B1
(45) Date of Patent: Sep. 15, 2009

(54) HIGH SENSITIVITY MECHANICAL FLUID LEVEL SENSING DEVICE AND METHOD OF USE

(76) Inventors: Scott David Green, 604 Ridge Rd., Birmingham, AL (US) 35206; Joseph Michael Wyatt, 5718 Bent Creek Dr., Pinson, AL (US) 35126

( * ) Notice: Subject to any disclaimer, the term of this patent is extended or adjusted under 35 U.S.C. 154(b) by 436 days.

(21) Appl. No.: 11/651,271

(22) Filed: Jan. 9, 2007

(51) Int. Cl.
*G01F 11/00* (2006.01)
*B67D 5/08* (2006.01)

(52) U.S. Cl. .................. 222/1; 222/64; 222/52
(58) Field of Classification Search .................. 222/14, 222/16, 21, 22, 40, 52, 55, 56, 64, 67; 200/61.2
See application file for complete search history.

(56) References Cited

U.S. PATENT DOCUMENTS

| | | | | |
|---|---|---|---|---|
| 1,084,658 A | * | 1/1914 | Pearson | 141/196 |
| 1,773,178 A | * | 8/1930 | Guermont | 222/65 |
| 1,790,410 A | * | 1/1931 | Tella | 222/65 |
| 2,128,488 A | | 8/1938 | Koerner | |
| 3,254,802 A | | 6/1966 | Barnes | |
| 3,822,032 A | | 7/1974 | Vergobbi | |
| 3,923,085 A | | 12/1975 | Nimer | |
| 4,033,190 A | * | 7/1977 | Hudspeth | 73/426 |
| 4,161,677 A | * | 7/1979 | Dill | 318/482 |
| 5,480,063 A | | 1/1996 | Keyes | |
| 5,542,412 A | | 8/1996 | Century | |
| 5,725,131 A | | 3/1998 | Bell | |
| 6,047,746 A | | 4/2000 | Green | |
| 6,253,959 B1 | | 7/2001 | Gaultney | |
| 6,371,331 B1 | | 4/2002 | Gohde | |
| 6,619,510 B2 | | 9/2003 | Green | |

* cited by examiner

*Primary Examiner*—Kevin P Shaver
*Assistant Examiner*—Daniel R Shearer
(74) *Attorney, Agent, or Firm*—Kenneth M. Bush; Gerald M. Walsh; Bush Intellectual Property Law

(57) ABSTRACT

A mechanical level sensor detects when a fluid material added to a chamber has reached a predetermined level and therefore comprises a predetermined particular volume. Material is added to a chamber until it has reached the predetermined level. Once this level is reached, additional material overflows into a level sensor. The overflow material causes a wheel having a plurality of wells to rotate. This rotation is detected by a control circuit that signals the cessation of addition of material to the chamber and the dispensing of the material present in the chamber. The sensor is highly sensitive due to the almost frictionless rotation of the wheel about its axle.

7 Claims, 4 Drawing Sheets

HIGH SENSITIVITY MECHANICAL FLUID LEVEL SENSING DEVICE AND METHOD OF USE

FIELD OF THE INVENTION

The present invention is directed to a mechanical fluid level sensing device. More specifically, the present invention is a mechanical device that determines when a liquid or fluid solid has reached a certain level in a chamber.

BACKGROUND OF THE INVENTION

It is often desirable to automatically and repeatedly dispense a predetermined volume of a material. This can be done manually by using a variety of measuring devices. Such devices include, but are not limited to, graduated cylinders, volumetric flasks, graduated pipettes, and weight scales. However, these methods must be performed manually by an individual and are both inefficient and time consuming. Therefore, several methods have been developed for automatically measuring and dispensing a predetermined amount of a material.

It is common to use a pump that is programmed to run for a predetermined length of time in order to dispense a set volume of material. Alternatively, piston-type pumps may be programmed to perform a single stroke when activated, thereby dispensing a volume of material equal to the volume displaced by the piston.

Dispensing chambers have also been developed that have an integrated weight scale. Material is added to the chamber until a particular, predetermined weight is reached. The material may then be dispensed from the chamber.

Direct volume measurement is also used in volumetric dispensing devices, particularly for measuring fluid materials. An accumulation chamber of a predetermined volume has a sensor at the top of the chamber. Material is added to the accumulation chamber until the level of the material reaches the level of the sensor and is detected. Upon detection, the addition of material to the chamber is halted and the material in the chamber is dispensed.

Volumetric dispensers have become increasingly common. However, a problem often encountered is finding a proper detection sensor for the top of the accumulation chamber. Photoelectric sensors are a common type of detector used. However, especially with granular solid material, they are not always accurate. Small granular material is often susceptible to both static electricity and caking due to ambient moisture. A small amount of the material may adhere to the sides of the accumulation chamber, thereby blocking the light emitted by the sensor. Thick liquids may also temporarily coat the walls of an accumulation chamber and make photoelectric measurement unreliable.

Electric current detection has also been used. When a conductive liquid reaches a sensor at the top of an accumulation chamber, a current may be detected at the level of the sensor. However, many materials are not conductive. Additionally, those that are may be damaged or altered by the application of an electric current.

Float type level switches have also been used. For example, toilets use a float type level switch to regulate the volume of water in its reservoir. However, float sensors are unusable for level detection of fluid solids.

It is therefore desirable to provide an accurate sensor for detecting when a fluid solid or a liquid has reached a certain point in an accumulation chamber.

SUMMARY OF THE INVENTION

The present invention provides a mechanical fluid level sensor that accurately determines when a liquid or fluid solid has reached the level of the sensor in an accumulation chamber of a volumetric fluid material dispenser. The sensor is housed in a sensor chamber attached to the side of an accumulation chamber. An inlet port at a predetermined level of the accumulation chamber places the top of the sensor chamber and the accumulation chamber in fluid communication with one another. When material being added to the accumulation chamber reaches the inlet port, a portion of it overflows out of the accumulation chamber and into the sensor chamber. Below the inlet port within the sensor chamber is a sensor wheel. The sensor wheel has a plurality of wells extending along its circumference. When the overflow material falls through the inlet port it drops into one of the wells of the sensor wheel. There is very little friction between the sensor wheel and the axle it rotates on. Therefore, only a very small amount of material needs to fall into a well of the sensor wheel in order for the weight to cause the wheel to rotate. The sensor wheel has a plurality of permanent magnets embedded within it. On one side of the sensing chamber is a reed switch integrated into a control circuit. As the sensor wheel rotates, one of its magnets will pass near the reed switch, thereby activating it. Triggering the reed switch causes the control circuit to send a signal to discontinue addition of material into the accumulation chamber. The material in the accumulation chamber is then dispensed. This may also be triggered by a signal from the control circuit. At the bottom of the sensor chamber is an outlet port which allows the material that actuated the sensor wheel to reenter the accumulation chamber and be dispensed with the material already in the chamber. When the sensor is used to measure the volume of a liquid, it is desirable to incorporate a check valve into the outlet port so that fluid rising in the accumulation chamber doesn't enter the sensor chamber prior to it reaching the inlet port.

After the material in the chamber has been dispensed, the exit port of the accumulation chamber is closed and the process may be repeated. Because the mechanism of the sensor is mechanical, it is very inexpensive to produce. In addition, the sensor has only one moving part making it reliable and easy to manufacture.

These and other features of the invention will become apparent from the following detailed description of the preferred embodiments of the invention.

DETAILED DESCRIPTION OF THE PREFERRED EMBODIMENTS

The present invention is a mechanical level sensor for use with a volumetric fluid material dispenser. It may be used to detect when a liquid or fluid solid has filled an accumulation chamber or other container to a particular level. As used herein, the terms fluid and fluid material refer both to liquids and fluid solids. The invention is accurate, reliable, and easy to manufacture.

Figure 1:
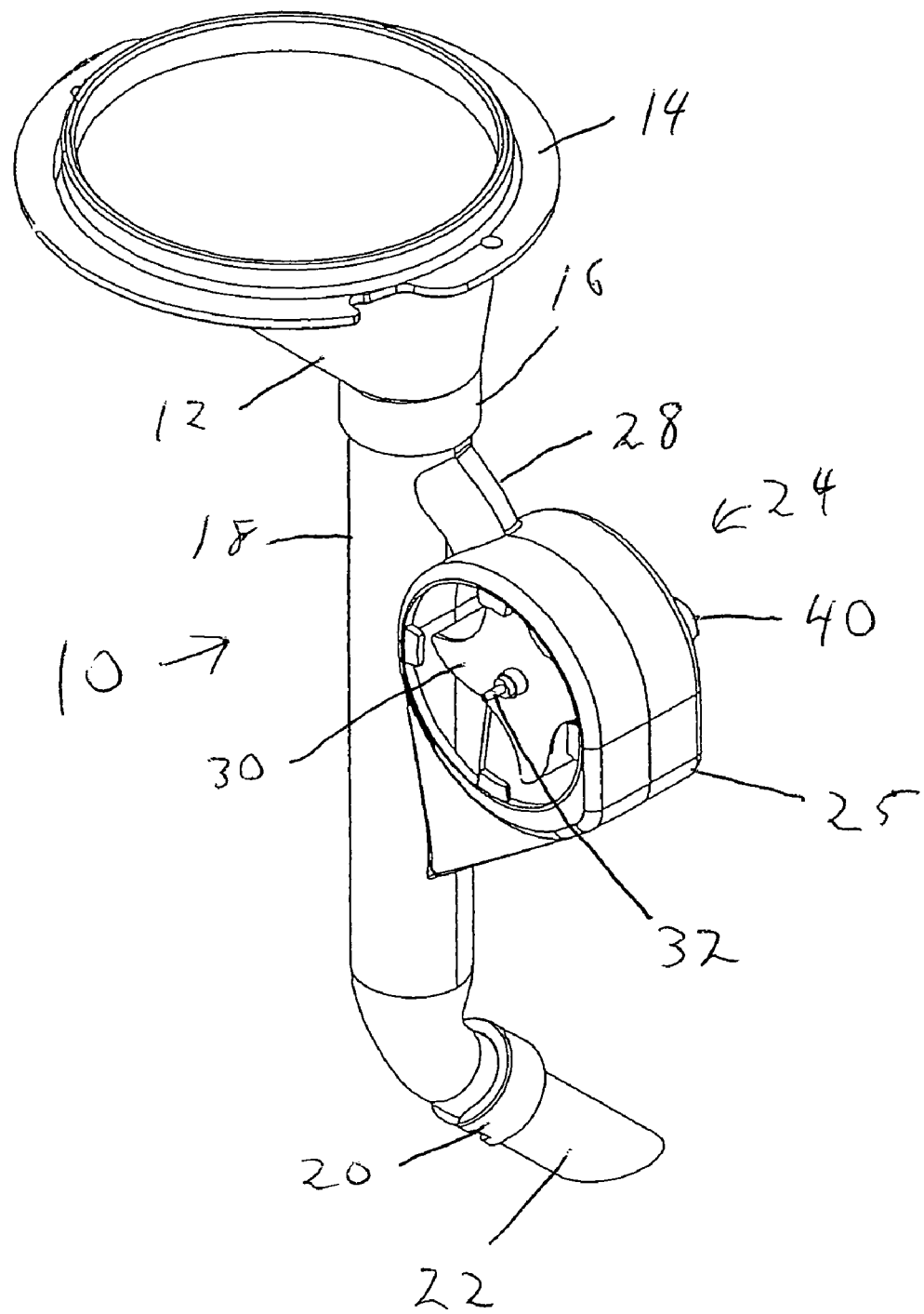
FIG. 1 is a perspective view of the invention.

FIG. 1 shows the level sensor 24 integrated with a volumetric fluid material dispenser 10. Volumetric fluid material dispenser 10 has a material entry port 12 attached to the top of accumulation chamber 18 by means of sleeve portion 16. Material entry port 12 has flange 14 for attachment to a depositing mechanism (not shown) that deposits material into accumulation chamber 18. At the bottom of accumulation chamber 18 exit valve 20 connects accumulation chamber 18 to exit conduit 22. As is explained below, both the depositing mechanism attached to material entry port 12 and exit valve 20 may be controlled by the control circuit of level sensor 24.

Entry port 12 may receive fluid that is deposited by means of either gravity or a pump. In this embodiment, entry port 12 is substantially conical in shape. Those skilled in the art will appreciate that port 12 may be any of a variety of shapes so long as it allows for transfer of a fluid from a depositing mechanism into the accumulation chamber 18. Additionally sleeve portion 16 may provide permanent or removable attachment of port 12 to chamber 18. It may be desirable for the port 12 to be removably attached to chamber 18 to facilitate cleaning or the interchanging of alternative entry ports having different structures.

Accumulation chamber 18 in this embodiment is cylindrical. However, accumulation chamber 18 may be of any of a variety of shapes. It is preferred that accumulation chamber 18 is relatively narrow, having a high height to width ratio. Those skilled in the art will appreciate that such a design allows for more accurate measurement of the volume of the accumulation chamber.

Exit valve 20 may be comprised of any of a variety of types of valves well known in the art, including but not limited to check valves, gate valves, ball valves and butterfly valves.

Level sensor 24 consists of sensor chamber 25. Sensor chamber 25 houses sensor wheel 30. Sensor wheel 30 rotates about axle 32. Control circuit 40 is attached to the outside of sensor chamber 25. Sensor chamber 25 is in fluid communication with accumulation chamber 18 by means of inlet conduit 28.

In this embodiment, chamber 25 is substantially cylindrical. Although this is a preferred design, sensor chamber 25 may be of any shape as long as it adequately houses the sensor wheel and protects it from outside influences, such as air turbulence, that may inadvertently cause wheel 30 to rotate when not desired.

Figure 2:
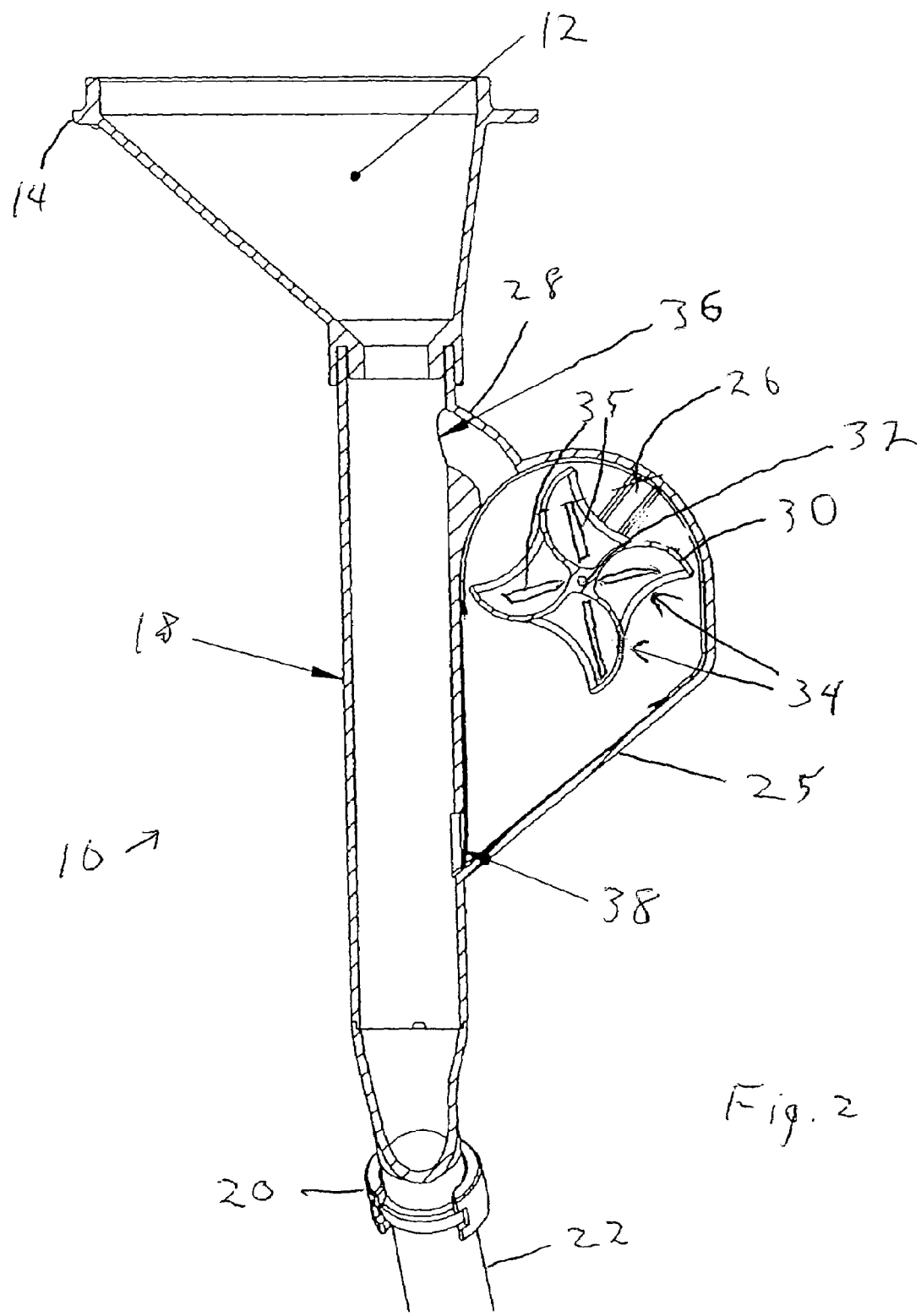
FIG. 2 is a left side cross-sectional view of the invention.

FIG. 2 shows a cross-sectional left side view of the fluid sensor integrated with the volumetric dispenser in order to more clearly illustrate the mechanism and functionality of the sensor. Here it can be seen that sensor wheel 30 has four wells 34 across the length of the circumference of wheel 30. Inlet conduit 28 allows fluid communication between accumulation chamber 18 and sensor chamber 25 by means of inlet port 36. Inlet conduit 28 and sensor wheel 30 are oriented such that material flowing into the sensor chamber 25 from the accumulation chamber 18 falls within one of the wells 34.

In operation, material is added to accumulation chamber 18 through material entry port 12. Valve 20 is closed so as to allow material to accumulate in the accumulation chamber. As the material accumulates it will pass the level of outlet port 38, which provides fluid communication between chamber 18 and the bottom of sensor chamber 25 below inlet port 36. To prevent the fluid from entering sensor chamber 25 through outlet port 38, it is preferable that port 38 comprises a check valve, biased toward the closed position, only allowing movement of fluid material from the sensor chamber 25 into the accumulation chamber 18. This prevents liquid or other material from entering sensor chamber 25 through outlet port 38. A check valve incorporated into outlet port 38 is necessary when volumetrically dispensing liquids and certain fluid solids. However, some fluid solids have cohesive or other properties that substantially prevent them from entering outlet port 38 even when there is no valve incorporated into it. When volumetrically dispensing such fluid solids, outlet port 38 requires no valve.

Material continues to accumulate in chamber 18 until it reaches the level of inlet port 36. At this point, material added through material entry cone 12 partially overflows into inlet port 36, down inlet conduit 28 and into one of the wells 34 of sensor wheel 30. Because there is extremely little friction between sensor wheel 30 and axle 32, only a small amount of overflow material will cause sensor wheel 30 to rotate. Sensor wheel 30 continues to rotate at least until the well in which the overflow material has fallen is overturned such that the material within it falls to the bottom of sensor chamber 25 where outlet port 38 is located.

Sensor wheel 30 has embedded within its walls permanent bar magnets 35 extending radially outward from the axle 32. When wheel 30 rotates as a result of material being deposited in one of its wells, one of embedded magnets 35 will pass reed switch 26. Reed switch 26 is either located on the outside of sensor chamber 25 or is embedded within the wall of sensor chamber 25. Those skilled in the art will appreciate that when a reed switch comes in close proximity of a magnetic field a circuit is completed within it. This provides a means for detecting the rotation of sensor wheel 30.

Figure 3:
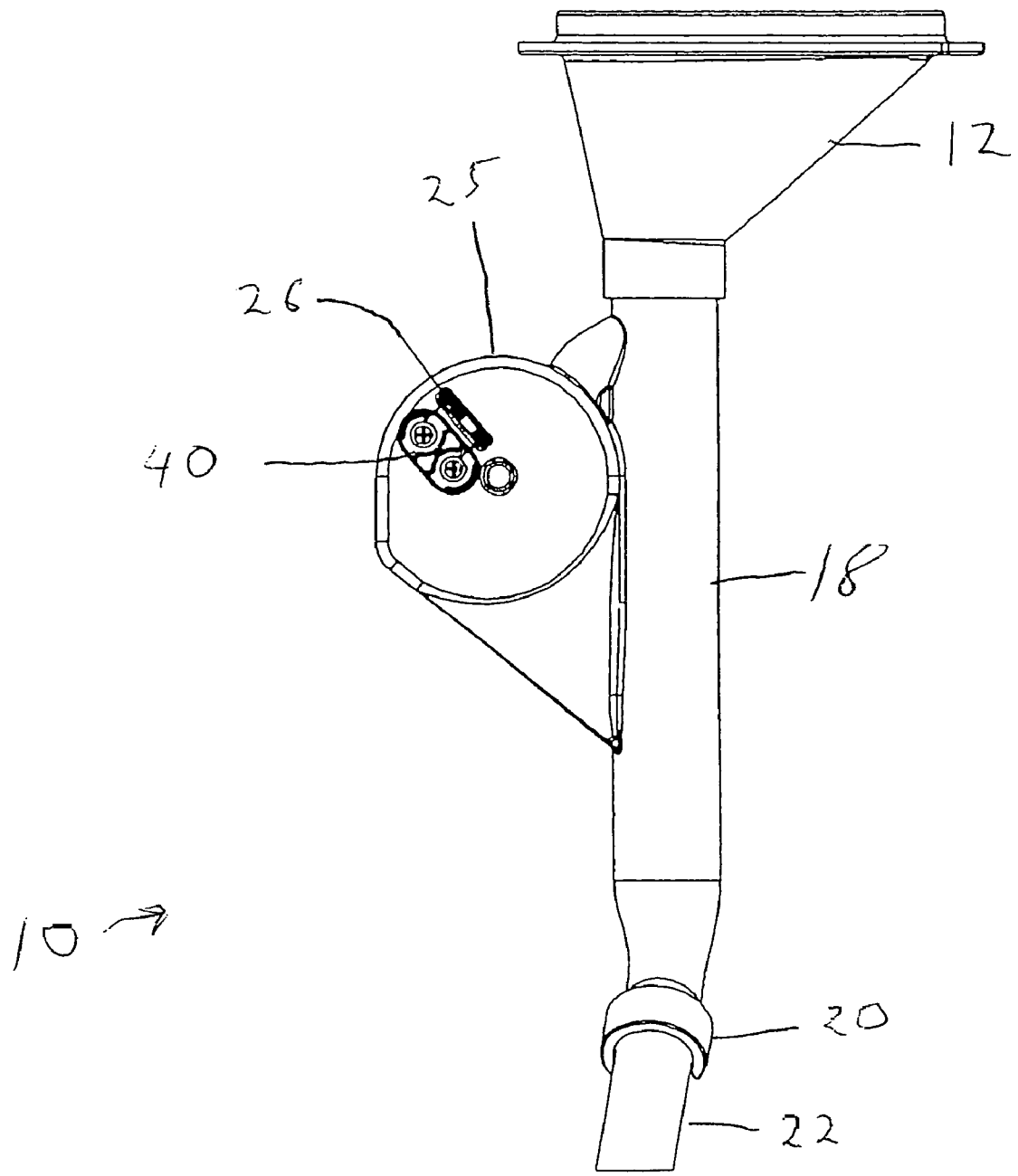
FIG. 3 is a right side view of the invention.

FIG. 3 shows in better detail reed switch 26 located on the side of sensor chamber 25. Reed switch 26 is an integral part of control circuit 40. When the reed switch 26 is actuated by the passing of one of bar magnets 35, control circuit 40 is activated. Control circuit 40 then sends a signal to stop material deposition into the accumulation chamber 18 through material entry port 12. Control circuit 40 also optionally sends a signal to open valve 20. Alternatively, another signal may actuate valve 20 causing it to open, or it may be done manually. Once valve 20 is opened, the material within the accumulation chamber 18 is dispensed through conduit 22 until accumulation chamber 18 is empty. The overflow material that has accumulated in the sensor chamber 25 at outlet port 38 returns to accumulation chamber 18 and is also dispensed through conduit 22. Once all of the material has been dispensed, exit valve 20 is closed and the cycle may be repeated.

Figure 4:
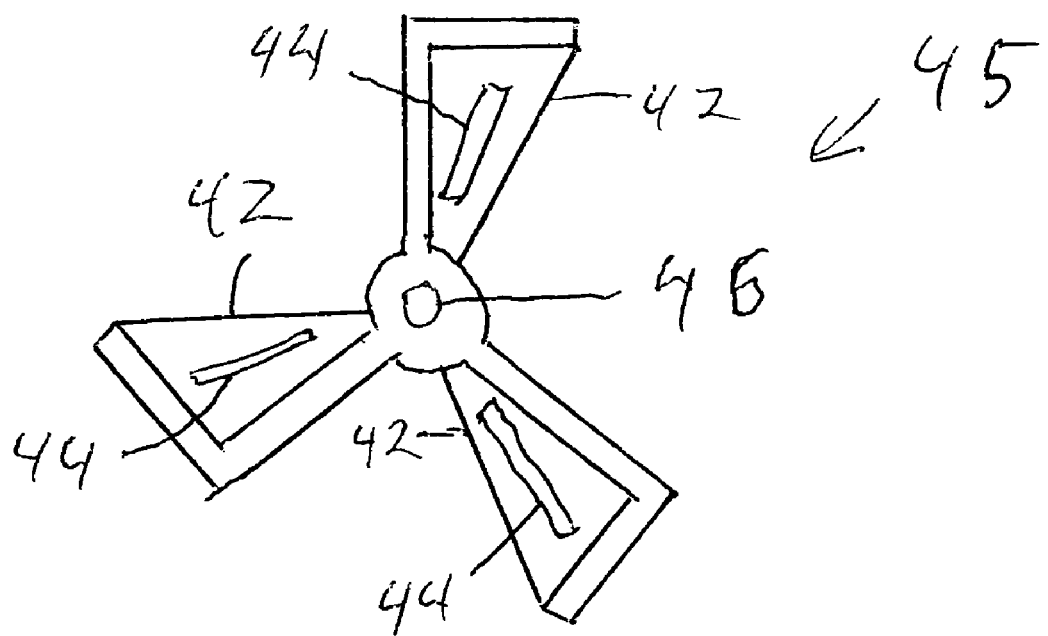
FIG. 4 is a side view of an alternative embodiment of the sensor wheel of the invention.

In the embodiment shown in FIGS. 1, 2, and 3 the sensor wheel has four concave wells. Those skilled in the art will appreciate that the wells may have other geometries and may be more or less than four in number. FIG. 4 shows an alternative embodiment of the sensor wheel 45. In this embodiment, three wells 42 are substantially V-shaped. Wheel 45 rotates about axle 46 and has embedded within it a series of permanent bar magnets 44 for actuation of a reed switch.

While the four well wheel 30 shown in FIGS. 1, 2, and 3 is preferred, other designs such as the three well design of FIG. 4 may be used. Similarly, sensor wheels having 5 or more wells may also be used.

In the preferred embodiment, a reed switch is used to detect the rotation of the sensor wheel. This is the preferred method of detecting the rotation of the sensor wheel because it does not add friction to the wheel's rotation. Other sensor methods that would require the wheel to contact a tab or a switch upon rotation would add substantial friction to the wheel's rotation and decrease the sensitivity of the sensor. On a small scale this is not practical. However, those skilled in the art will appreciate that if the invention is used to measure relatively large scale liquid volumes or large scale fluid solids, such as gravel or the like, other methods of detecting the sensor wheel's rotation may be suitable.

What is claimed is:

1. A method for volumetrically dispensing a fluid material comprising:
   a) filling an accumulating chamber of a volumetric dispenser with a fluid material until a mechanical level sensor signals the cessation of said filling; and
   b) removing said material from said volumetric dispenser by means of an exit valve attached to said accumulating chamber of said volumetric dispenser;
   c) wherein said volumetric dispenser comprises said accumulating chamber, a material entry port attached to said accumulating chamber and having a bottom comprising an exit valve, an attached level sensing chamber having a top, a side, and a bottom, an inlet conduit providing fluid communication between said top of said level sensing chamber and said accumulating chamber by means of an inlet port, a sensor wheel in said level sensing chamber having a circumference with at least three wells about said circumference, a control circuit on said side of said level sensing chamber, an outlet port at said bottom of said level sensing chamber and providing fluid communication between said level sensing chamber and said accumulating chamber, and means for said control circuit to detect when said sensing wheel rotates, wherein upon material filling said accumulating chamber, excess material enters said inlet port and falls upon said sensing wheel, thereby rotating said sensing wheel such that said control circuit detects said rotation of said sensing wheel and signals the cessation of the material filling said accumulating chamber.

2. The method of claim 1 wherein said means for said control circuit to detect when said sensing wheel rotates comprises a plurality of radially extending magnets embedded within said sensing wheel and a reed switch incorporated into said control circuit.

3. The method of claim 1 wherein said at least three wells comprises four wells.

4. The method of claim 1 wherein said outlet port comprises a check valve.

5. A volumetric dispenser comprising:
   a material entry port;
   an accumulating chamber attached to said material entry port and having a bottom comprising an exit valve;
   an attached level sensing chamber having a top, a side and a bottom;
   an inlet conduit providing fluid communication between said top of said level sensing chamber and said accumulating chamber by means of an inlet port;
   a sensor wheel in said level sensing chamber having a circumference and at least three wells about said circumference;
   a control circuit on said side of said level sensing chamber;
   an outlet port at said bottom of said level sensing chamber and providing fluid communication between said level sensing chamber and said accumulating chamber; and
   means for said control circuit to detect when said sensing wheel rotates;
   wherein upon material filling said accumulating chamber, excess material enters said inlet port and falls upon said sensing wheel, thereby rotating said sensing wheel such that said control circuit detects said rotation of said sensing wheel and signals the cessation of the material filling said accumulating chamber.

6. The volumetric dispenser of claim 5 wherein said control circuit signals said exit valve to open upon detecting said rotation of said sensing wheel.

7. The volumetric dispenser of claim 5 wherein said means for said control circuit to detect when said sensing wheel rotates comprises a plurality of radially extending magnets embedded within said sensing wheel and a reed switch incorporated into said control circuit.

* * * * *